April 20, 1948. W. A. WEIGHTMAN 2,439,915
PORTABLE ROLLER WELDER
Original Filed Oct. 26, 1943  7 Sheets-Sheet 1
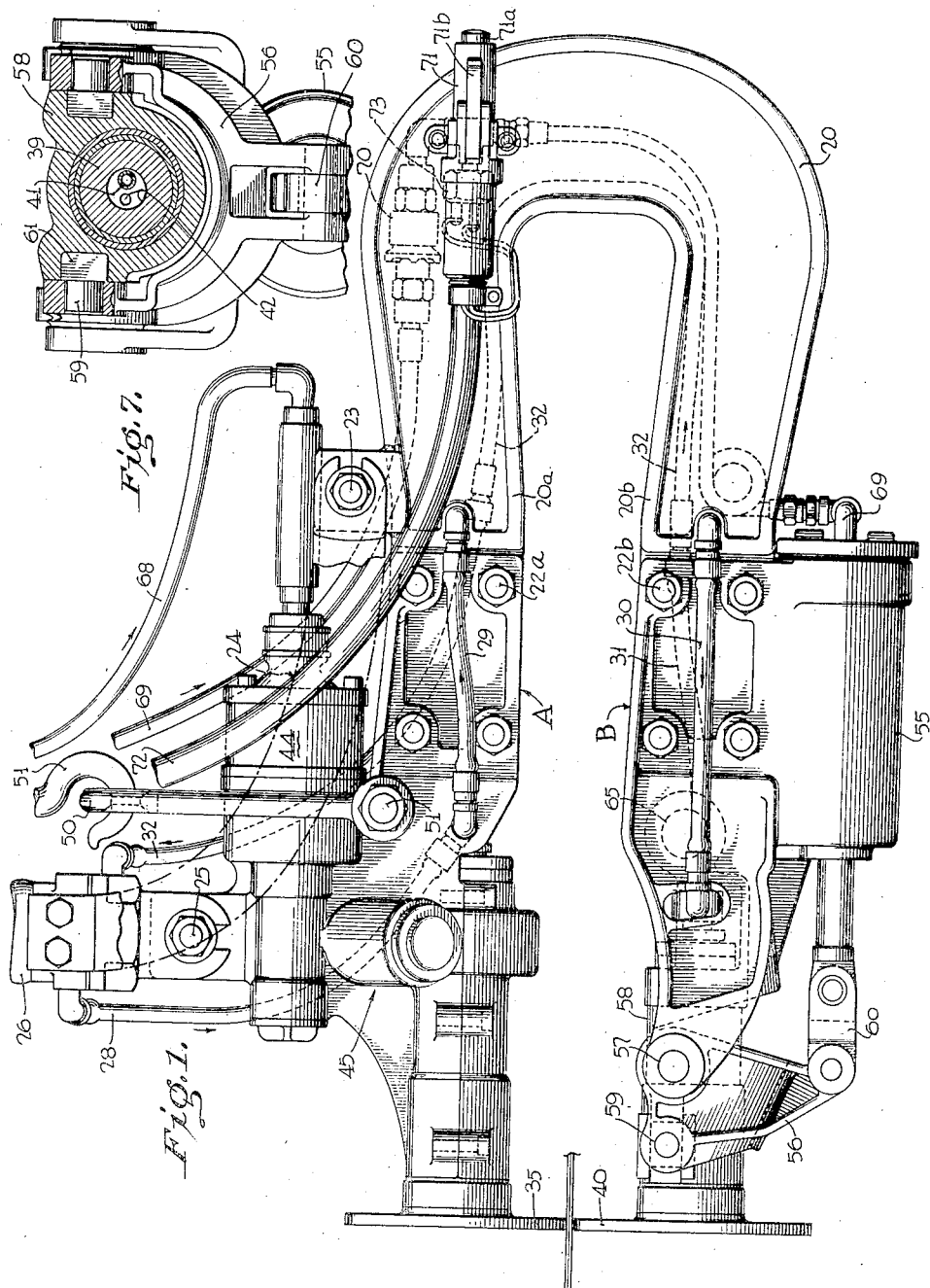
William A. Weightman
INVENTOR
BY Donald B. Waite
ATTORNEY

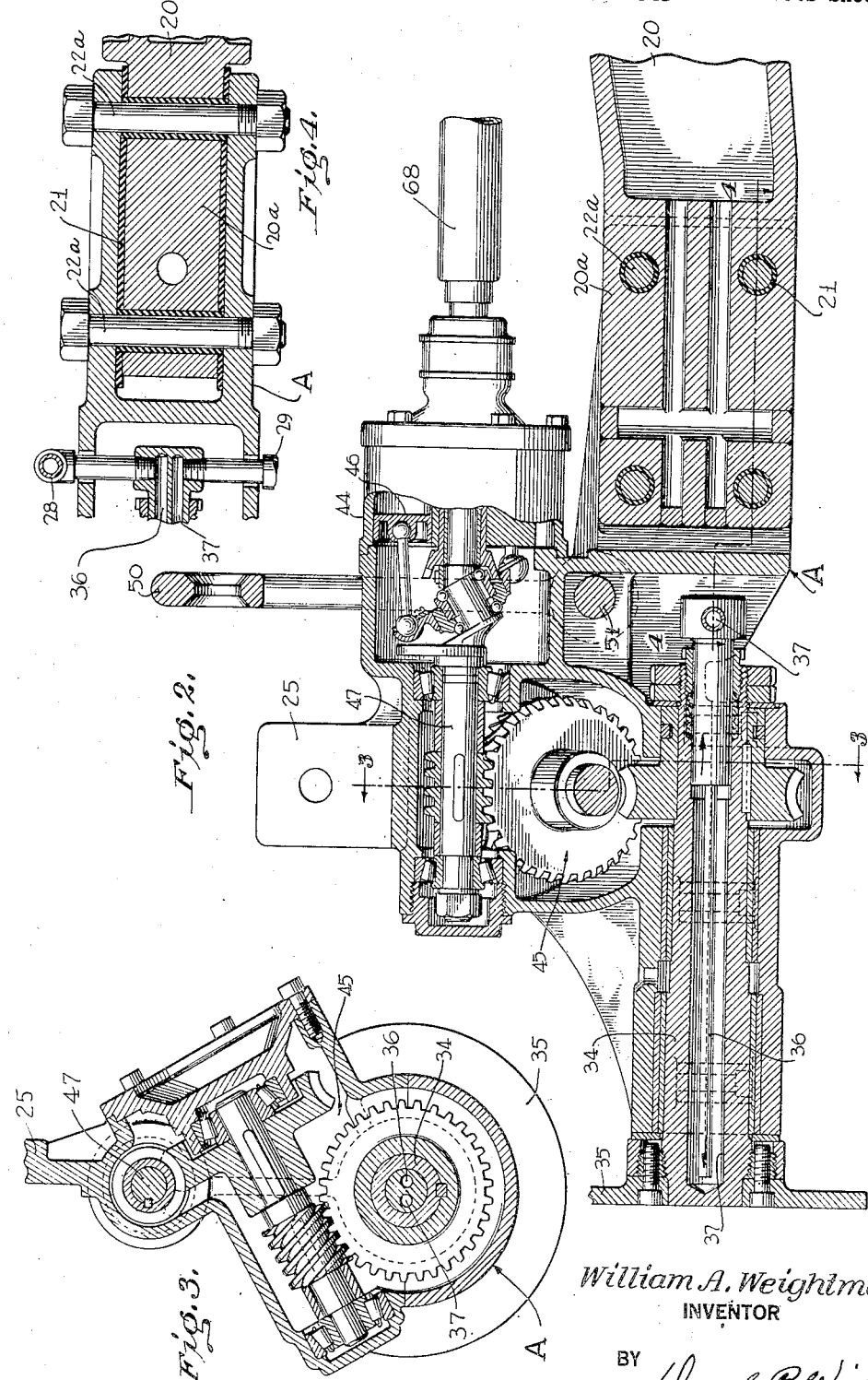

April 20, 1948.  W. A. WEIGHTMAN  2,439,915
PORTABLE ROLLER WELDER
Original Filed Oct. 26, 1943   7 Sheets-Sheet 3
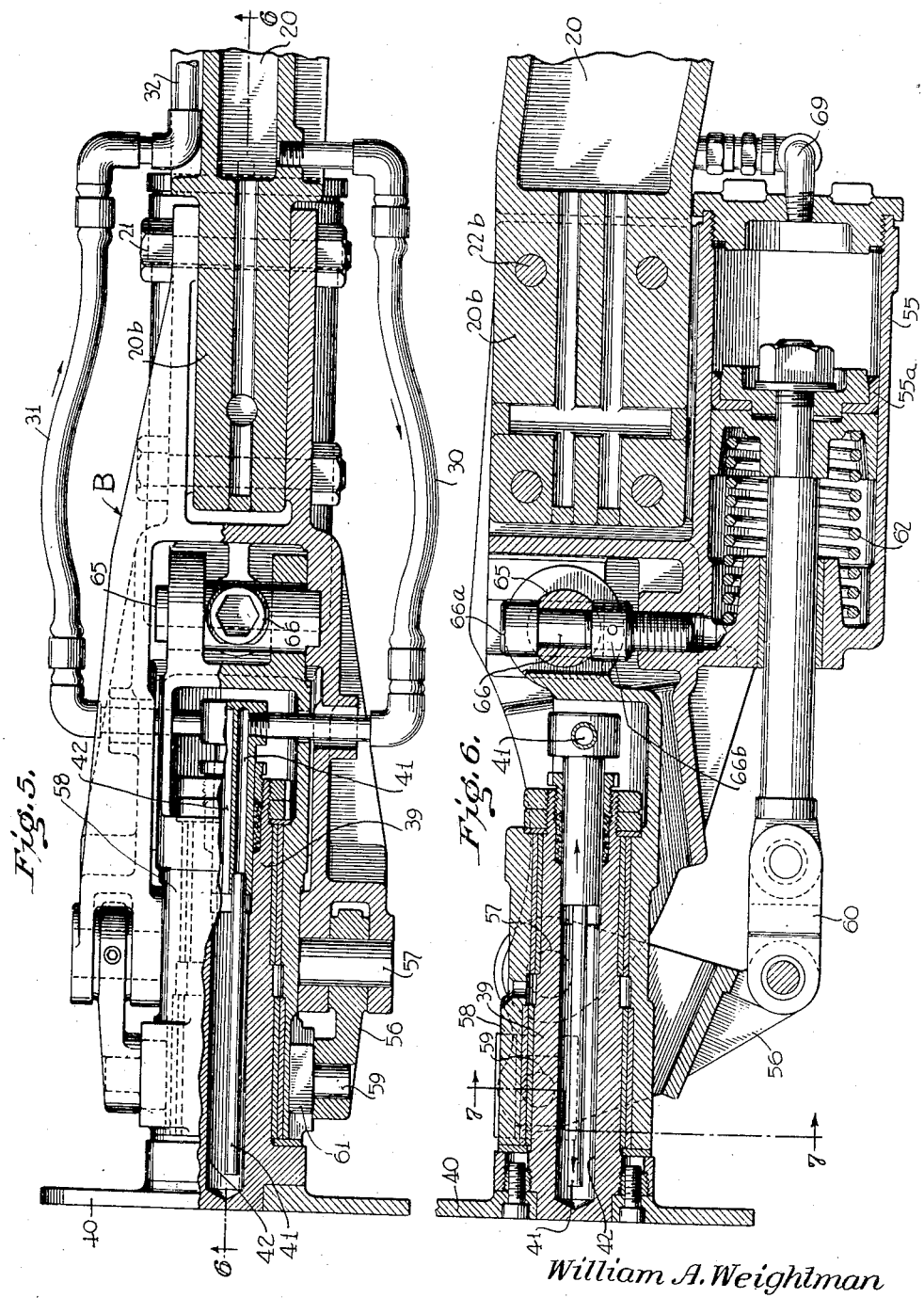
William A. Weightman
INVENTOR
BY Donald B Waite
ATTORNEY

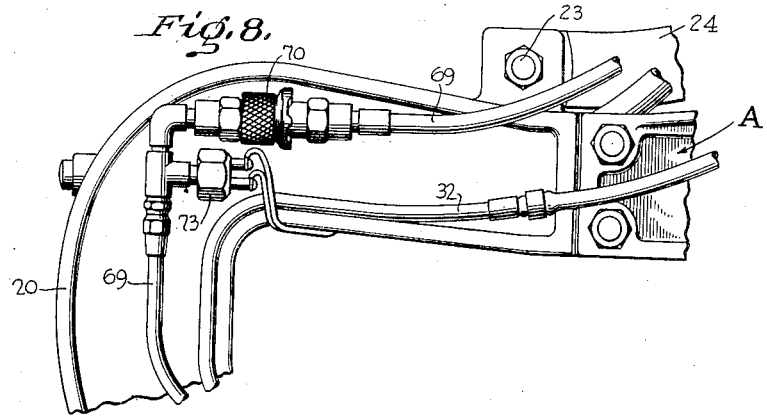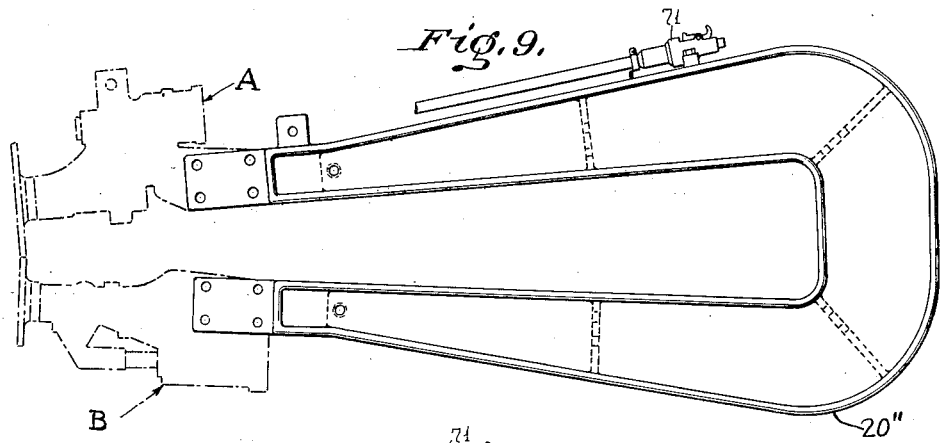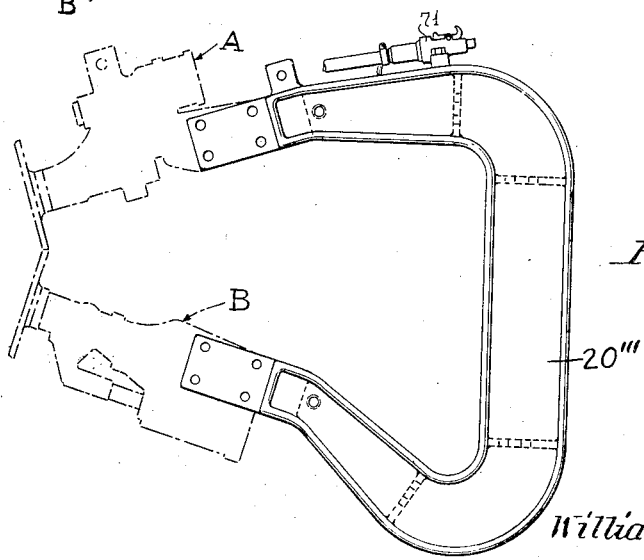

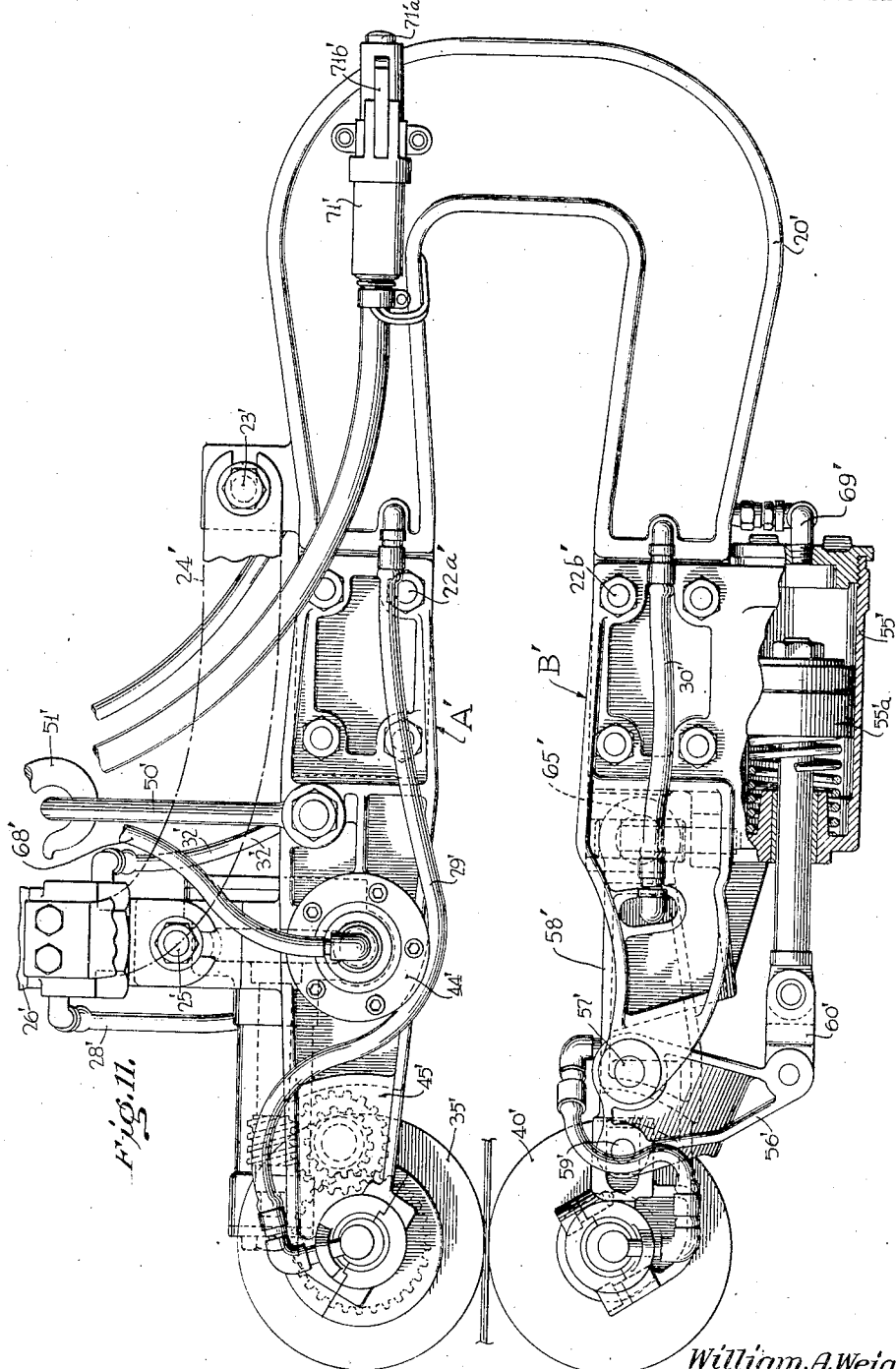

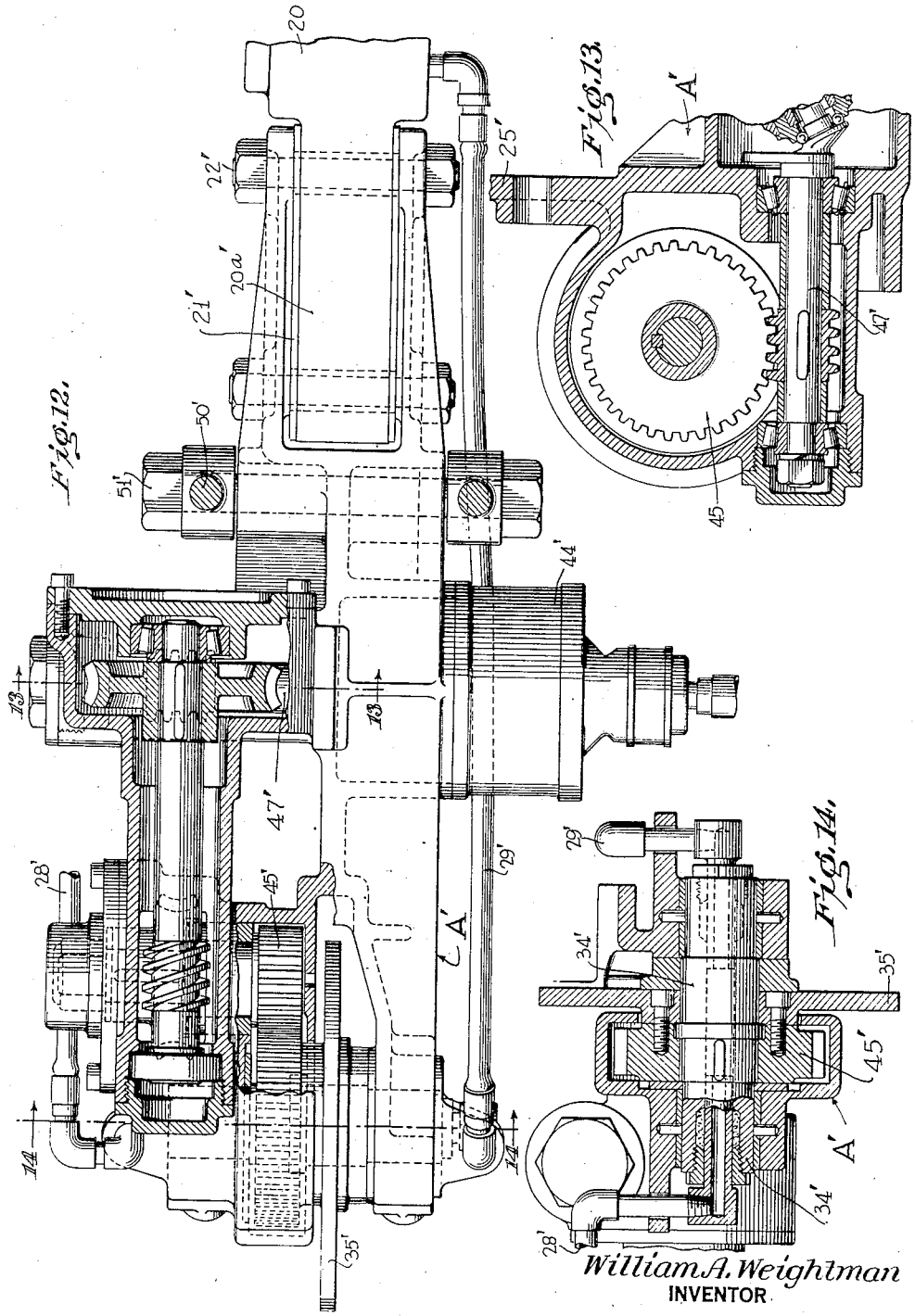

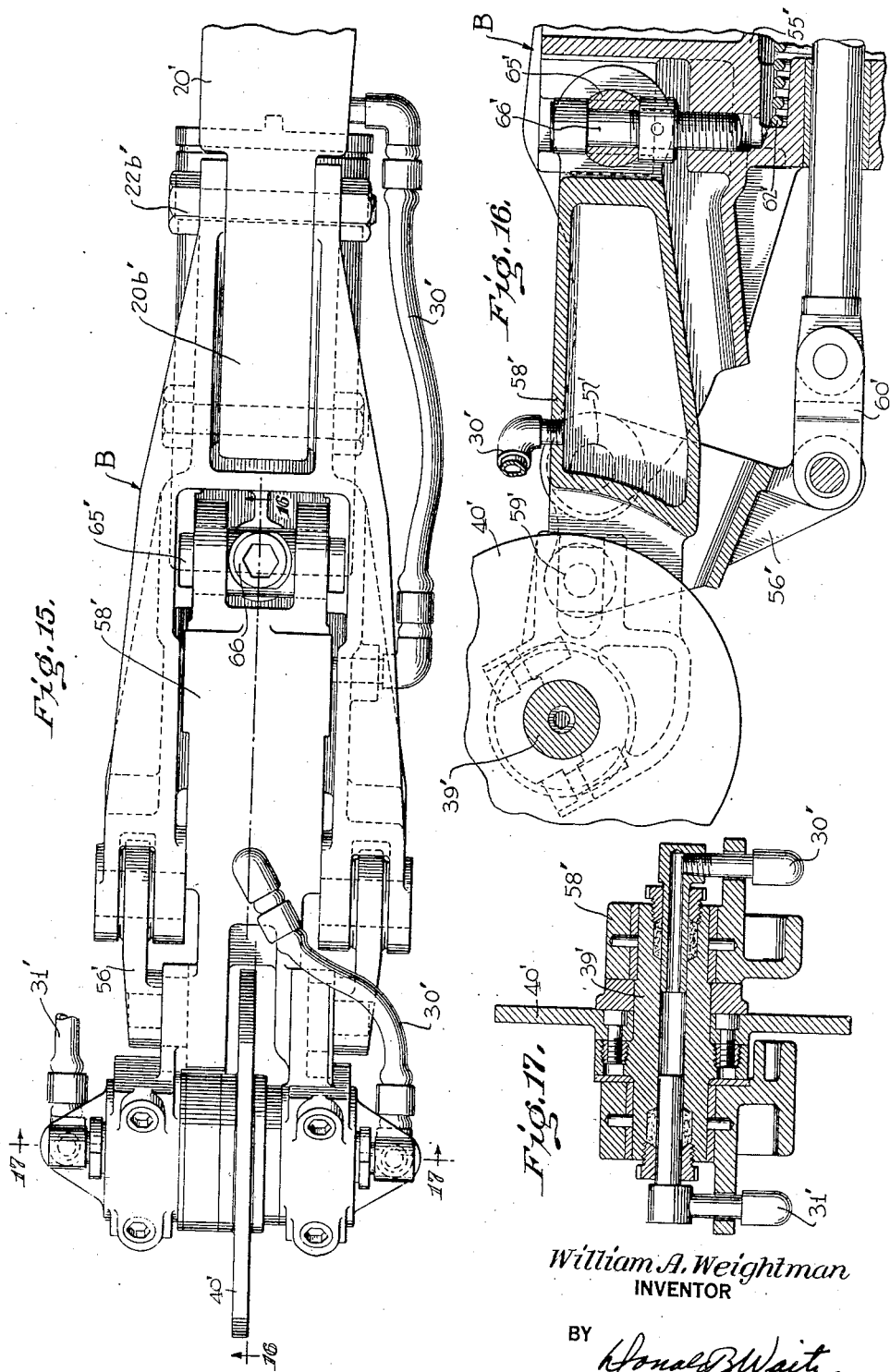

Patented Apr. 20, 1948

2,439,915

UNITED STATES PATENT OFFICE 2,439,915

PORTABLE ROLLER WELDER

William A. Weightman, Philadelphia, Pa., assignor to The Budd Company, Philadelphia, Pa., a corporation of Pennsylvania Continuation of application Serial No. 507,667, October 26, 1943. This application October 23, 1946, Serial No. 705,142

19 Claims. (Cl. 219—4)

This is a continuation of applicant's copending application Serial No. 507,667, filed October 26, 1943, for "Portable roller welders," now abandoned.

This invention relates to resistance welding apparatus, particularly to a portable roller welder, and has for an object the provision of improvements in this art.

One of the particular objects of the invention is to provide a completely self-contained portable roller welder wherein the drive motor is carried on the welder.

Another object is to provide a portable roller welder having the maximum clear space between the rolls.

Another object is to provide a roller welder which is detachably mounted in two separate parts on the two spaced ends of a yoke to permit the use of yokes of various sizes.

Another object is to provide roll driving means of ample and variable speed and power which will not stall.

Another object is to provide roll driving means which is advantageously disposed relative to the rolls to provide smooth operation at the weld line.

Another object is to provide a portable roller welder in which the weight is advantageously disposed relative to the two ends of the yoke and relative to the point of support.

Another object is to provide improved mounting and adjusting means for the pressure roll.

Another object is to provide unique roll disposition for special types of work.

The above and other objects and advantages of the invention will be apparent from the following description of certain exemplary embodiments thereof, reference being made to the accompanying drawings wherein:

Fig. 1 is a side elevation of an embodiment having roll and motor axes aligned with the plane of the yoke;

Fig. 2 is a vertical axial section through the driven roll and related parts on one arm of the yoke;

Fig. 3 is a vertical transverse section taken on the line 3—3 of Fig. 2;

Fig. 4 is a partial horizontal section taken on the line 4—4 of Fig. 2;

Fig. 5 is a horizontal section through the pressure roll and related parts on the lower arm of the yoke;

Fig. 6 is a vertical axial section taken on the line 6—6 of Fig. 5;

Fig. 7 (on sheet 1) is a vertical transverse section taken on the line 7—7 of Fig. 6;

Fig. 8 is a partial side elevation to show certain controls, the view being taken on the side opposite that of Fig. 1;

Fig. 9 is a side elevation showing the roll heads changed to a different yoke;

Fig. 10 is a view similar to Fig. 9 showing another yoke shape for a different type of work;

Fig. 11 is a side elevation of a modification;

Fig. 12 is a top plan view, partly in section, of the apparatus shown in Fig. 11;

Fig. 13 is a partial transverse vertical section taken on the line 13—13 of Fig. 12;

Fig. 14 is a partial transverse vertical section taken on the line 14—14 of Fig. 12;

Fig. 15 is a top plan view of the pressure roll and related parts mounted on the lower arm of the Fig. 11 embodiment;

Fig. 16 is a partial vertical axial section taken on the line 16—16 of Fig. 15; and Fig. 17 is a vertical transverse section taken on the line 17—17 of Fig. 15.

Referring to Figs. 1 to 7, the portable roller welding apparatus here shown comprises a yoke 20 carrying two replaceable heads on the ends of its arms, the upper arm 20a carrying a driven roll head or assembly A and the lower arm 20b carrying a pressure roll head or assembly B.

The upper head A is secured to the yoke's one end 20a with the interposition of insulation 21 by bolts 22a and the lower head B is secured to the yoke's other end 20b without insulation by bolts 22b, insulation not being needed in the second case because the yoke 20 carries current to the lower head from a terminal 23 and a flexible cable or conductor 24 connected thereto. The upper head A receives current from a terminal 25 connected to one conductor of a water-cooled cable 26, the other conductor of which is connected to said cable 24.

The yoke is hollow and water or other coolant is circulated therethrough and through the heads, flexible hose and tubing connections 28, 29, 30, 31 and 32 being employed to circulate the coolant in the path indicated by the arrows. This path is from a concentric supply hose, made as a unit with the cable 26, to the upper head; from the upper head to the yoke; from the yoke to the lower head; and from the lower head to the other concentric supply hose of cable 26. Within the spindle 34 of the upper or driven roll 35 the coolant is circulated in from the hose 28 through a passage and an inner tube 36 and passes out through the shaft boring and passage 37 to hose 29. Within the spindle 39 of the lower or pressure roll 40 the coolant is circulated in from hose 30 through passage and tube 41 and out through the shaft boring and passage 42 to hose 31.

Roll 35 is rotatably supported in head A. Means are provided for driving roll 35 at a selected rotary speed in either direction, the motive means being mounted wholly on the welder head A and preferably comprising a pneumatic piston motor 44 and suitable reduction gearing generally denoted by the reference 45. In its specific form the motor comprises a plurality of axial pistons 46 operating in companion cylinders and a wabble plate drive shaft 47. It should be noted that the driving motor and most of the gear are arranged on the outside of the yoke or, in other words, roller 35 with its motor and gear are all arranged on one side of the work line, that is, the plane passing through the contact points of both rolls.

The welder is suspended by a clevis 50 pivoted at 51 to the upper head A closely adjacent the motor 44, and a hoist of any suitable type as by a hook 51 so as to be readily removable.

Means are provided for moving the lower or pressure roll 40 from and toward the driven roll and for adjusting its position relative thereto, such means being mounted wholly on the lower arm of the yoke and preferably on the lower head B. The preferred means here illustrated comprise a pneumatic motor 55 integral with head B having a piston 55a operating in a companion cylinder integral with head B and a lever 56 pivoted to bifurcated arms of the lower head B at 57 and to the spindle bearing 58 at 59. The lever is connected to the piston rod by a pivoted link 60. The specific connection of the pivot pins 59 to the spindle casing 58 includes slide blocks 61 on the pins which operate in suitable guides of casing 58.

The piston 55a is retracted by a spring 62 when the air pressure is released.

The pressure roll 40 is mounted on the arm 58 in relation to its pivot 65 on the lower head so that it will approach the driven roll almost on a straight line.

Means are provided for shifting the pivot 65 so the pressure roll may be made to approach the driven roll in the most favorable manner and to compensate for wear and for rolls of different size. The means illustrated (Fig. 6) comprises a stud or bolt 66 rotatably mounted in the pivot 65 and threaded into the head B. The stud is provided with shoulders on its head 66a and a collar 66b which engage either side of the pivot pin so as to move the latter toward or away from the axis of the roll 40.

In the modification shown in Figs. 11 to 17, many of the parts are the same, in effect, as in the first embodiment. Other parts correspond in kind. All are designated by the same reference characters with the addition of a prime (').

The principal change is that the welding rolls 35' and 40' have their planes aligned with the plane of the yoke; or stated another way, the spindles 34' and 39' are perpendicular to the plane of the yoke. This provides travel in a weld line in the plane of the yoke and any width stock within the limits of the yoke opening may be welded across its width.

Here again, as in the case of the driven roll and its motor, it should be noted that motor 55 with the transmission to the roll 40 is arranged on the same side as the roll of the work line or plane passing through the contact points of the rolls and that the motor is arranged on the outside of the yoke.

The motor 44', as before, has its piston and shaft axis disposed in the direction of the roll spindle axis. The pressure piston 55', however, is still parallel to the plane of the yoke.

Operating fluid, preferably air, for the drive motor 44 is supplied by a fluid supply line 68 from a fixed control station (not shown). Likewise, operating fluid for the pressure motor 55 is supplied from the control station by a fluid supply line 69. A supply and exhaust valve 70 is provided in the line 69 of the pressure motor at a point convenient to the operator. It is here shown to be located near the neck or bar of the yoke. Near the same location there is provided a control device 71. This is a dual two-stage device for controlling the operation of the drive motor 44 and for controlling the supply of current to the rolls. The control device 71 includes a switch operating plunger 71a and a quick release latch 71b. The plunger moves down against a spring in two stages to operate two switches in succession, the latch catching and holding the plunger at each stage. The first stage starts the drive motor into operation and the second stage causes welding current to be supplied. If the latch 71b is operated by hand in emergency or to terminate a welding operation, the plunger is fully released and moves to the end of its outward travel. A control cable 72 extends from the control device 71 to the fixed control station. To provide assurance of having sufficient pressure when the welding current is applied there is provided a pressure operated contact device 73 connected pneumatically (Fig. 8) to the supply line 69 on the motor side of the valve 70 and connected electrically to the fixed control station.

In operation the valve 70 is operated to supply fluid to the pressure motor 55, after which the plunger 71a of the control device 71 is pushed down to start the drive motor and to apply the welding current when the pressure switch 73 permits.

Fig. 9 shows an arrangement similar to that of Fig. 1 but in which a very deep yoke 20'' has been substituted for the shorter yoke.

Fig. 10 shows a similar arrangement in which a deep yoke 20''' is provided and in which the rolls are arranged at a considerable angle to each other to reach into recesses or to straddle assemblies with thick edges.

It is thus seen that the invention provides welding apparatus which is very simple and compact and easily handled. It will weld along straight or curved lines in any direction, the rolls moving along a straight line until shifted by the operator. Surfaces of double curvature may be welded as readily as plane surfaces or surfaces of single curvature. The rolls may be opened to insert over or to pass over obstructions. The pneumatic motor will drive at any speed with great power without speed-change gearing and without danger of stalling. The operation is smooth and not likely to disturb the position of the stock since there is no reciprocatory movement perpendicular to the plane of the stock. Nor is there any particular vibration along the length of the seam where roller movement relative to the stock might be produced, the motor shaft and piston axes being perpendicular to the plane of the rolls.

While certain embodiments of the invention have been described and illustrated by way of example, it is to be understood that various embodiments are possible within the limits of the prior art and the scope of the subjoined claims.

What is claimed is:

1. A portable roller welding device comprising in combination, a rigid yoke with spaced arms, a driven welding roller mounted on a first arm of said yoke, a drive motor mounted on said first arm having a driving connection with said driven roller, a shiftable roller mounted on the second arm of said yoke, and a motor mounted on said second arm having a connection with said shiftable roller for moving it toward and from said driven roller.

2. A portable roller welding device comprising in combination, a portable frame having spaced arms, a driven welding roller mounted on a first arm of said frame, a drive motor mounted on said frame having a driving connection with said driven roller, a mating welding roller mounted on the second arm of said frame, and a pressure motor mounted on said frame for moving one of said rollers toward and from the other, said drive and pressure motors being mounted on opposite sides of the work line between rollers.

3. A roller welding device comprising in combination, a yoke, a welding roller mounted on one arm of said yoke, a mating welding roller mounted on an arm pivoted to the yoke, the pivot axis being parallel to a plane passing between the rollers, and means for adjusting the position of the roller arm pivot on the yoke arm in a direction transverse to said plane.

4. A portable roller welding device comprising in combination, a portable frame having a pair of spaced arms, welding rollers mounted on said arms, fluid pressure motors mounted on said frame for turning said rollers and for moving them to closed and open positions respectively, control means mounted at said frame for applying and releasing fluid from the motor which opens and closes said rollers, control means mounted at said frame for applying and releasing fluid from the roller driving motor, control means mounted at said frame for applying and halting electric current flow to said rollers, and means mounted at said frame for preventing application of electric current until the pressure on said rollers has reached a predetermined amount.

5. A portable roller welding device as set forth in claim 4, further characterized by the fact that said control means comprises switches mounted in relation to an operator which first causes fluid to be supplied to the roller drive motor and thereafter causes current to be supplied to said rollers, said operator being latched in each stage of operation, and means for releasing said operator for full return at one stage.

6. A portable roller welder comprising a frame, a driven welding roller mounted on an arm of said frame, a shiftable mating welding roller mounted on said frame, and separate pneumatic means mounted on said frame and operated by pneumatic fluid from a common source of rotating positively said driven roller and for shifting said shiftable roller.

7. A portable roller welding device comprising in combination, a portable frame having two companion arms spaced apart at the end, a welding roller mounted on each arm, a motor mounted on said frame for moving said rollers relatively toward and from each other, and a motor mounted on said frame for rotating one of said rollers, one of said motors driving the roller on one arm, and the other motor moving the roller on the other arm from and toward the driven roller.

8. A portable roller welding device comprising in combination, a portable frame having two companion arms spaced apart at the end, a welding roller mounted on each arm, and separate pneumatic motors mounted on said frame deriving fluid from a common source for driving one of said rollers and for moving one of said rollers in at least one of the directions from and toward the other roller.

9. A roller welding device comprising a frame having two arms, a welding roller and a motor drivingly connected with said roller mounted on one of said arms, a member guidingly connected with said frame for movement at least in part toward and away from said roller, a second welding roller mounted on said member opposite said first roller but free of driving connection with said motor, and a second motor between said frame and said member for moving said rollers toward and away from each other.

10. In a portable roller welder, a frame having two parts, a welding roller and a motor drivingly connected with each other and both mounted on one of said parts, a second welding roller mounted on the other one of said parts opposite said first roller but free of driving connection with said motor, means guidingly connecting said parts, and a second motor between said parts for movement of said rollers toward and away from each other.

11. In a portable roller welding device, a frame comprising two hingedly connected arms each carrying a welding roller and at least one of them carrying a motor drivingly connected with only the roller carried by the same arm, and a second motor interconnecting said arms for moving said rollers toward and away from each other.

12. A roller welding device comprising a frame having two arms, a first welding roller and a first motor drivingly connected with said roller mounted on the first one of said arms, a member guidingly connected to the other arm of said frame for movement at least in part toward and away from said roller, a second welding roller carried on said member opposite said first roller but free of driving connection with said motor, and a second motor between said frame and said member for moving said rollers toward and away from each other, said frame comprising three units removably connected with each other, to wit: a first unit forming at least the end of said first arm and including said first roller and motor, a second unit constituting at least the end of said other arm and including said roller carrying member and its guiding connection as well as the attachment points of said second motor to said arm and member, and a third exchangeable frame unit interconnecting said first two units.

13. A portable roller welding device comprising: a first unit having a member carrying a first welding roller and a first motor drivingly connected with said roller; a second unit including a first member movably connected to a second member, the latter carrying a second welding roller, and a second motor between said two last-named members for moving them relative to each other; and a third exchangeable unit in the form of a rigid member interconnecting said member of said first unit and said first member of said second unit for holding said two rollers in juxtaposition.

14. Unit adapted for removable connection to another complementary unit of a portable roller welder, said unit comprising a supporting member and a supported member guidingly connected with each other for back and forth movement in one direction, means for carrying a welding roller on said supported member, and a motor interposed between said two members for imparting the aforesaid relative movement.

15. A portable roller welder comprising: a supporting member provided with means for removable connection to another complementary unit of the welder, a supported member, a journal connection between said two members, means for carrying a welding roller on said supported member, and a motor interposed between said two members for moving the latter relative to each other about the axis of said journal connection.

16. A portable roller welding device comprising in combination, a portable frame having spaced arms, a driven welding roller mounted on a first arm of said frame, a prime mover mounted on said frame having a driving connection with said driven roller, a mating welding roller mounted on the second arm of said frame, and means, including a second prime mover, mounted on said frame for moving said rollers toward and from each other.

17. In a portable roller welder, a frame having two arms, one arm carrying a welding roller driven by a motor mounted on the outside of said frame, said other arm carrying a movable member with a second welding roller in juxtaposition to said first-named roller, and a second motor mounted on the outside of the structure composed of said frame and said member and adapted for moving said movable member so as to move said second roller respectively toward and away from said first roller.

18. A portable roller welding device comprising in combination, a portable frame, a driven welding roller mounted on a first arm of said frame, a prime mover mounted on said frame in close proximity to and having a driving connection with said driven roller, means carrying a mating welding roller movably mounted on a second arm of said frame, and a second prime mover between said frame and said means for moving the latter, thereby moving said rollers toward and from each other.

19. In a portable roller welder, a frame having two arms, one arm carrying a welding roller driven by a motor mounted on the outside of said frame, said other arm having journalled to it a lever carrying another welding roller opposite said first-named roller, and a second motor mounted on the outside of the structure composed of said frame and said lever, that is, on the side of the structure opposite a plane passing between the rollers, said second motor serving for swinging said lever about its journal so as to move said rollers toward and away from each other.

WILLIAM A. WEIGHTMAN.

REFERENCES CITED

The following references are of record in the file of this patent:

UNITED STATES PATENTS

| Number | Name | Date |
|--------|------|------|
| 1,576,160 | Tobey | Mar. 9, 1926 |
| 1,965,521 | Culter | July 3, 1934 |